July 29, 1952

J. VOCELKA 2,604,994

FIBER DISK FILTER ASSEMBLY

Filed Oct. 17, 1950

Inventor
John Vocelka
by Parker & Carter
Attorneys

July 29, 1952 J. VOCELKA 2,604,994
FIBER DISK FILTER ASSEMBLY
Filed Oct. 17, 1950 2 SHEETS—SHEET 2

Inventor
John Vocelka
by Parker & Carter
Attorneys

Patented July 29, 1952

2,604,994

UNITED STATES PATENT OFFICE 2,604,994

FIBER DISK FILTER ASSEMBLY

John Vocelka, Elmwood Park, Ill., assignor to Wm. W. Nugent & Co., Inc., Chicago, Ill., a corporation of Illinois Application October 17, 1950, Serial No. 190,519

3 Claims. (Cl. 210—169)

This invention relates to improvements in filters, and more particularly to filters employing filter stacks made up of a plurality of fiber discs arranged in generally concentric relation within a filter casing for filtering liquid which is passed either from the exterior to the interior of the filter stack or vice versa.

The principal object of the invention is to provide an improved form and arrangement of filter stack including a plurality of similar cutout discs affording filtering action both through proximate discs and adjacent portions of the same discs, so as to provide maximum filtering capacity in filtering stacks of this general character.

The invention may best be understood by reference to the accompanying drawings, in which.

Figure 1:
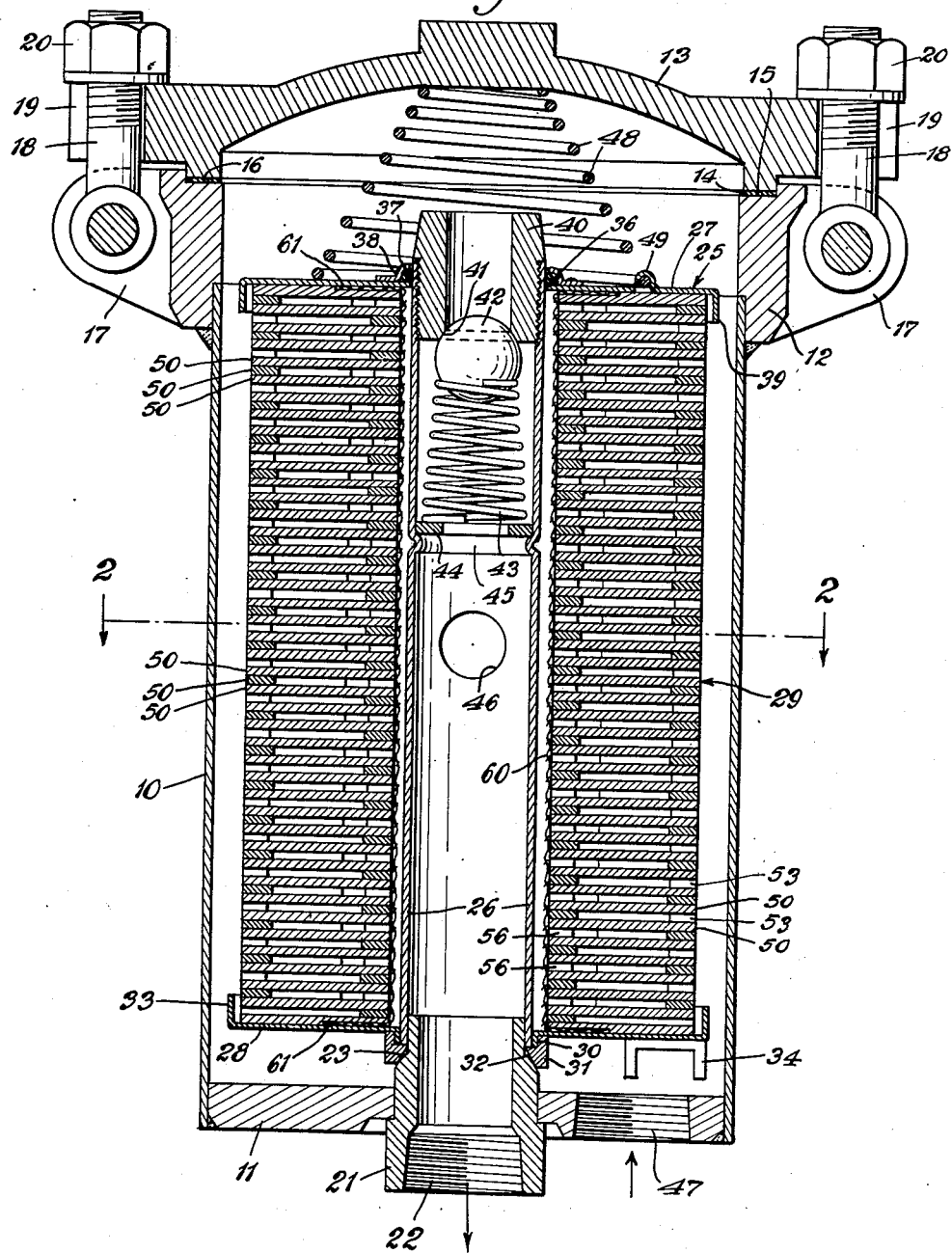
Figure 1 is a vertical cross-sectional view taken through a filter unit embodying my invention.

Referring now to details of the embodiment of my invention illustrated in the drawings, the filter unit includes a cylindrical casing 10 having an integral bottom 11 and an upper rim 12 with a suitable circular cover 13 forming a closure for the open end of the casing. A gasket 14 rests upon a seat 15 of the rim 12 and is engaged by a bearing portion 16 of the cover. The cover is secured to the casing by a pair of lugs 17, 17 each having a bolt 18 pivoted thereto and adapted to be swung into upright slots 19, 19 formed in the periphery of the cover 13. The bolts 18 have nuts 20 threaded in their outer ends for engaging the upper surface of the cover adjacent the edges of the slots 19 and, as a result, press the cover 13 firmly against the gasket to form a liquid-type closure.

A hollow stud 21 is fixed in and extends through the bottom wall 11. The lower end of the stud 21 is threaded interiorly at 22 adapted for connection by a suitable communicating pipe. The upper end of said stud is exteriorly beaded at 23 to form a seat for a detachable filter unit indicated generally at 25.

The filter unit 25 consists essentially of a central tube 26, a top plate 27, a bottom plate 28 and a stack of filter discs indicated generally at 29 interposed between said top and bottom plates. In the form shown herein, the bottom plate 28 is centrally apertured with a flange 30 which surrounds and is fixed to the lower end of the central tube 26. A ring 31 is secured to the flange 30, said ring having an interior tapered surface 32 adapted to engage the seating surface 23 of the stud 21. The bottom plate 28 has a peripheral flange 33 for receiving the lower end of the filter stack 29 therein. A plurality of supporting legs 34, herein consisting of U-shaped lugs of greater height than the lower face of the seating ring 31, may be attached to the under face of the bottom plate 28 so as to permit the entire unit to be supported in standing position when it is removed from the filter casing.

The top plate 27 is centrally apertured at 36 for relative sliding engagement along the upper end of the central tube 26. In order to seal the joint between the top plate and central tube during sliding adjustment, an O-ring 37 of suitable elastic material is held by an annular retaining ring 38 about the face of the top surface of the aperture 36 in yielding engagement against the tube 26. The top plate has a depending peripheral flange 39 for receiving the upper end of the filter stack 29.

The upper end of the central tube 26 has a hollow plug 40 threaded therein, the lower face of which has an annular seat 41 for a ball check 42. Said ball check is normally urged against the seat 41 by a coil spring 43 having its lower end abutting an annular collar 44 sitting against an inwardly offset annular rib 45 in the tube 26. The ball check device just described forms a check valve for relieving excess pressure of liquid within the casing when the central tube 26 is arranged, as shown herein, as the outlet passage of the filter unit and liquid is supplied to the unit through an inlet passage 47, in the bottom wall of the casing.

The central tube 26 has one or more perforations 46 intermediate its ends, for passage of liquid from the filter stack 29 to the interior of said tube.

The filter unit is held in place within the casing by a coil spring 48, preferably tapered so that its smaller end engages the under face of the cover 13 centrally thereof and its larger lower end engages the top plate 27. In the form shown, the lower end of the coil spring 48 is permanently secured to the top plate by a clip 49 formed integrally with said plate and bent upwardly and secured around the spring wire, as shown in Figure 1.

Figure 4:
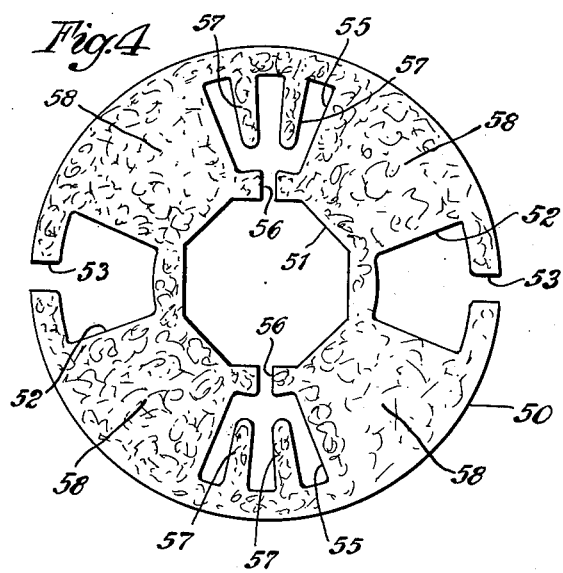
Figure 4 is a detailed plan view of a single filter disc.

Referring now to details of the filter stack which constitutes the principal feature of my invention, the stack indicated generally at 29 is made up of a large number of similar discs 50, 50, one of which is shown in Figure 4. Each such disc is made of a suitable sheet fibrous material, such as wood pulp, paper, felt, or spun glass, capable of affording filtering action for a liquid when forced under pressure therethrough from an inlet passage to an outlet passage of the stack.

Each disc 50 is cut out at its center to form an opening 51, preferably of a regular polygonal shape, herein in the form of an octagon. A pair of openings 52, 52 are cut out in the disc between the central opening 51 and the periphery thereof, and each of said openings communicating with the periphery through restricted passages 53. In the form shown, the two openings 52 are in diametrically opposed relation to each other. For the purposes of the present description, these openings may be considered as inlet openings and their connected passages 53 as inlet passages. As will presently appear, said openings and passages may be used as outlet openings if the filter is modified so that liquid is passed therethrough in the reverse direction.

A second pair of openings 55, 55 are formed in the disc 50 between the central opening and periphery, in diametrically opposed relation to each other, and substantially midway between the adjacent pair of inlet openings 52, 52. This second pair of openings, which may be considered as outlet openings, are provided with restricted outlet passages 56 communicating with the central opening 51.

Figure 2:
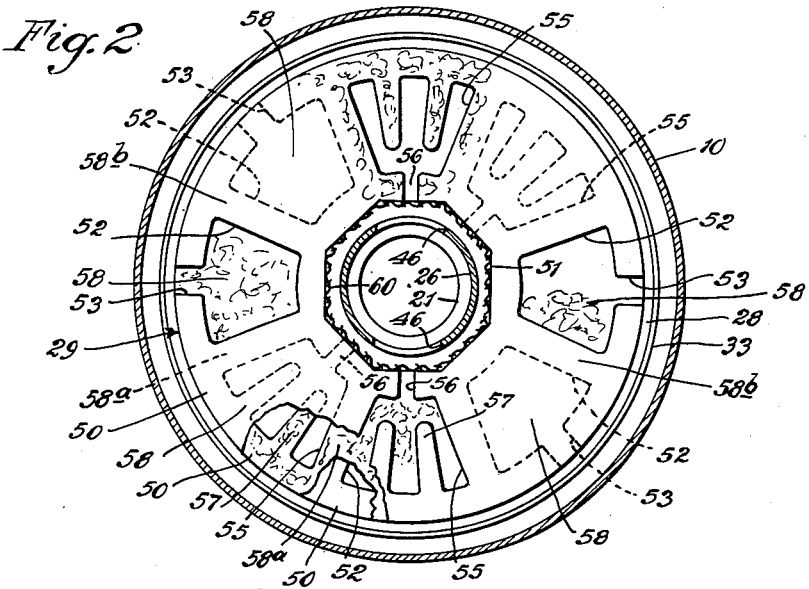
Figure 2 is a section taken on line 2—2 of Figure 1, with parts of a filter disc broken away to show the relative position of the next succeeding filter disc therebeneath.
Figure 3:
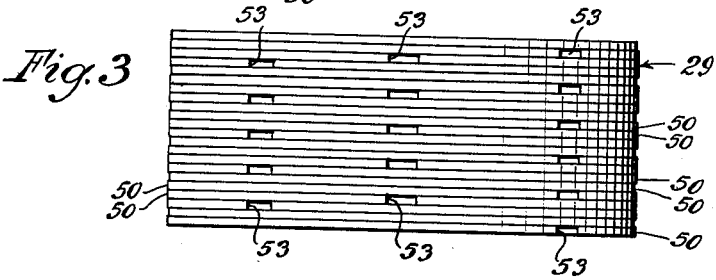
Figure 3 is a detailed view of a plurality of discs stacked one on top of another to form a part of the entire filter stack used in the filter shown in Figure 1.

As will be seen from Figures 2 and 4, both the inlet openings 52 and the outlet openings 55 are preferably of substantially the same outer dimensions, and each are widened toward the periphery of the disc.

Figure 5:
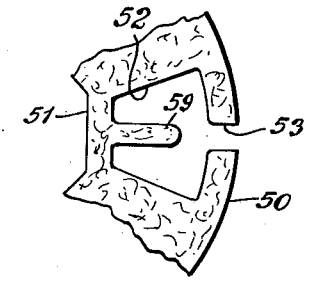
Figure 5 is a fragmentary detail of a modified form of disc.

In the form shown herein, each outlet opening 55 is provided with a plurality of integral inwardly extending fingers 57, herein two in number, to aid in supporting the stack against localized collapse when the stack is in assembled relation. Each inlet opening 52 may also, if desired, be provided with one or more integral tongues for the same purpose, as indicated for instance at 58 in the modified form of disc, shown in Figure 5.

The imperforate spaces 58 between each adjacent inlet and outlet opening are of substantially greater circumferential width than the width of said inlet and outlet openings. The two pairs of inlet and outlet openings are disposed at angles of ninety degrees to each other. The arrangement of inlet and outlet openings and the central opening 51 is such that, when a plurality of such discs are stacked in position for filtering action, each successive disc is disposed at an angle of forty-five degrees with respect to the preceding disc, as shown in Figure 2. As a result, each pair of inlet openings 52 register with an intermediate imperforate area 58 of both the overlying and underlying proximate disc.

It will be understood that the number of pairs of inlet and outlet openings may be varied in different filter disc designs, but, in any case, each successive disc is turned at that angle to the preceding disc which is substantially one-half of the angle at which the proximate inlet and outlet openings of each disc are disposed to each other. The resulting stack, when in assembled relation will then present a filtering structure, wherein each inlet opening registers with an outlet opening in the second proximate disc, and separated therefrom by an intermediate imperforate area 58 of an intervening disc. With this arrangement, liquid passing into each of the inlet openings 52 through their inlet passages 53 of one disc will be filtered by passing through the intermediate areas 58 of both the overlying and underlying proximate discs in the stack into the registering outlet openings 55 in the second disc above and below the first disc.

In addition to the filtering action through proximate discs as just described above, a further filtering action occurs circumferentially of the stack, that is to say through the side walls of each pair of adjacent inlet and outlet openings 52 and 55 of immediately adjacent discs. It will be observed from Figure 2 that, with respect to any two proximate discs, an inlet opening 52 of one disc is separated circumferentially in areas indicated at 58a by an intermediate wall of filtering material from the inlet opening 52 of the overlying and underlying discs.

In the preferred form of filter stack shown in Figures 1 and 2, a length of tubular stockinet or woven fabric 60 is fitted lengthwise within the central opening of said stack with its upper and lower ends turned outwardly as indicated at 61, 61 and secured by pressure normally maintained on the stack between the uppermost and lowermost discs and the proximate faces of the top and bottom plates 27, 28. This stockinet provides relatively fine filtering action in addition to that provided by the filter stack, and in particular serves to filter out any loose fibers which may escape from the fiber discs of the stack toward the filter outlet.

The use and operation of the filter unit above described, and particularly the novel form of filter stack, is as follows:

The individual filter discs 50 are cut out or stamped with suitable dies in the form shown in Figure 4. They are then stacked one upon the other with each successive disc turned at an angle which is one-half of the angle at which each proximate pair of inlet and outlet openings are disposed with respect to each other. For instance, in the form of disc shown in Figure 4 where the inlet and outlet openings are disposed at angles of ninety degrees to each other, each successive disc is disposed at an angle of forty-five degrees to the preceding disc in the completed stack. To aid in stacking the discs at the proper angular relation to each other, the central opening 51 of the disc is made of the proper polygonal shape so that the discs may be stacked on a suitable mandrel (not shown) of the same polygonal shape, to aid in positioning the discs at the desired angular relation to each other.

When the discs are stacked in their proper angular relationship, to the desired height of the stack, the stockinet 60 is then inserted in the central opening of the stack and the entire stack is then mounted between end plates 27, 28 with the central tube 26 of the detachable filter unit projecting through the central opening of the stack.

The discs may be retained in their proper angular relation during subsequent handling of the stack, by maintaining moderate endwise pressure on the stack sufficient to hold the individual discs in place by friction against each other, until the stack is assembled in the detachable filter unit, including the central tube 26 and end plates 27 and 28 with the filter stack 29 mounted therebetween. When the filter unit is finally set in operative position in the casing as shown in Figure 1, with the cover 13 secured to the casing, the holding spring 48 will maintain a constant pressure on the floating upper plate 27 and thus keep the stack of discs under a moderate degree of compression.

I find that, under varying conditions and with different types of liquid, there may be substantial endwise expansion and contraction in the stack 29, which variation is taken care of automatically by a sliding movement of the top plate, but with the top plate always sealed by the O-ring 37 against leakage of liquid from the outer portion of the casing into the central opening of the filter stack at the point of juncture of the top plate 27 and the tube 26.

The use of the check valve 42 in the filter unit is optional with filtering devices of this character and forms no part of the present invention.

The normal path of liquid through the filtering discs of the stack may now be traced as follows:

When the liquid is passed through the filter from the inlet opening 47 in bottom plate 11 to the central hollow outlet stud 21, the liquid passes into the exterior portion of the casing surrounding the filter stack 29 and thence into the many inlet passages 53 to the inlet openings 52 of the discs. From each inlet opening 52 the liquid passes upwardly and downwardly through the proximate filtering portions 58, 58 of the overlying and underlying discs to the outlet openings 55, 55 of the second proximate discs in the stack. From these outlet openings, the liquid then passes through outlet passages 56, 56 and stockinet 60 to the central passage along the central tube 26 and from thence through the perforations 46 in the central tube to the outlet passage 56.

Some of the liquid which passes into the inlet openings 52 will also be filtered by passing in a peripheral direction through relatively narrow side wall portions of the discs indicated at 58a in Figure 2, into the outlet openings 55, 55 of the proximate overlying and underlying discs. It will be understood that no flow of liquid will take place through the opposite wall 58b of each inlet opening 52 toward the similar inlet opening 52 of the proximate overlying and underlying discs because the opposing pressures exerted against the intervening side walls 58b will be balanced in each case.

Although the specific embodiment of filter shown in the drawings is designed to direct the flow of liquid from the exterior to the interior of the stack, it will be obvious to those skilled in the art that the filter can, with slight modification, be rearranged so that the flow of liquid can be reversed therethrough and passed for filtering from the interior to the exterior of the stack.

Although I have shown and described a practical and operative device, obviously other changes could be made in my invention by those skilled in the art to which the invention pertains and therefore I do not wish to be limited excepting as set forth in the appended claims.

I claim:

1. A filter disc for a filter stack made of fibrous sheet filtering material, said disc having a central aperture and a plurality of pairs of cut-out openings disposed symmetrical around said central aperture, said openings being of substantially equal angular width circumferentially of the disc, and spaced apart circumferentially of the disc a substantially greater distance than their circumferential width by an axially imperforate area of filtering material, and said openings communicating alternately with the periphery and with the central aperture of the disc through restricted passageways of substantially less circumferential width than a minimum width of said openings.

2. A filter stack for filters consisting of a plurality of similar discs of fibrous sheet filtering material, each of said discs having a central aperture and a plurality of pairs of cut-out openings disposed symmetrically around said central aperture, said openings being of substantially equal angular width circumferentially of the disc, and spaced apart circumferentially of the disc a substantially greater distance than their circumferential width by an axially imperforate area of filtering material, said openings communicating alternately with the periphery and with the central apertures of the discs through restricted passageways of substantially less circumferential width than the minimum width of said openings, said discs being stacked in face-to-face relation but with proximate discs in angularly offset relation to each other with the inlet and outlet openings of one disc registering with the axially imperforate filtering areas of the proximate discs.

3. A filter stack in accordance with claim 2, wherein the outlet and inlet openings of all discs are in registering relation axially of the stack, and the inlet and outlet openings, respectively, of any two alternate discs are separated for filtering by the imperforate filtering areas of an intervening disc.

JOHN VOCELKA.

REFERENCES CITED

The following references are of record in the file of this patent:

UNITED STATES PATENTS

| Number | Name | Date |
| --- | --- | --- |
| 619,569 | Hewel | Feb. 14, 1899 |
| 2,359,475 | Gauthier | Oct. 3, 1944 |
| 2,457,122 | Burley | Dec. 28, 1948 |
| 2,501,582 | Rohland | Mar. 21, 1950 |
| 2,522,502 | Clark | Sept. 19, 1950 |
| 2,548,584 | Briggs | Apr. 10, 1951 |